UNITED STATES PATENT OFFICE.

EDWARD SWINEY, OF ANDOVER, MASSACHUSETTS.

IMPROVEMENT IN PROCESSES FOR DYEING BLUE.

Specification forming part of Letters Patent No. 8,494, dated November 4, 1851.

*To all whom it may concern:*

Be it known that I, EDWARD SWINEY, of Andover, in the county of Essex and State of Massachusetts, have invented a new and useful Mode or Process of Dyeing Fabrics or Manufactures a Dark or Blue Color; and I do hereby declare that the same is hereinafter fully described.

Take a dye or decoction of either one or more of the woods known in commerce by the names of "cam-wood," "guinea," "red-wood," "bar-wood," or "red-sanders," and dye any material to be dyed with the same, and more or less according to the depth of shade of blue to be finally produced. After the cloth or fabric has been so dyed it is next to be dipped into a solution of prussiate of potash, with which the usual acids have been combined to produce light-blue or prussiate-of-potash color. The dark blue or color required is thus produced by the two processes of dyeing, and the making such color by such processes and the use of a dye or solution of one or more of the said woods, together with a dye of prussiate of potash, I claim as my invention or mode of producing a dark blue or color to take the place of indigo, which color can be produced at a very great saving of expense in comparison to that incurred by the employment of indigo in the usual way.

I do not mean to claim the use of a prussiate-of-potash dye alone; but

I do claim—

The employment of such dye in combination with either one or more of the above-named woods, substantially in manner as specified.

In testimony whereof I have hereunto set my signature this 29th day of April, A. D. 1851.

EDWARD SWINEY.

Witnesses:
 CHRISTOPHER KELLY,
 SAMUEL JOHNSON.